Dec. 7, 1965  H. S. PIEN  3,222,628

FORCE MEASURING DEVICE

Filed Dec. 31, 1962

INVENTOR.
Hsia S. Pien
BY
Attorney

United States Patent Office 3,222,628
Patented Dec. 7, 1965

3,222,628
FORCE MEASURING DEVICE
Hsia S. Pien, Newton, Mass., assignor to Baldwin-Lima-Hamilton Corporation, a corporation of Pennsylvania
Filed Dec. 31, 1962, Ser. No. 248,510
7 Claims. (Cl. 338—4)

This invention relates to force responsive devices and particularly to one of a diaphragm type for measuring fluid pressure force, although the force sensing element of the device may be useful in dynamometers generally.

In fluid pressure responsive devices of the type employing a pressure actuated diaphragm, it is a usual characteristic of such diaphragms to have a small degree of non-linearity in their relation of deflection vs. the actuating force. In a device of the type broadly disclosed herein, the diaphragm acts against a strain sensitive element which in some instances in the prior art has been a solid column, a bending beam, or other suitable type of element. The strain induced in the element by the applied force is measured by strain gages preferably of the bonded electrical resistance filament type well known in the art and forming a part of a usual Wheatstone bridge circuit. However, these prior devices do not produce a linear electrical output for a given deflection of the diaphragm because of the well known non-linearity of the diaphragm in its deflection vs. actuating force.

It is an object of my invention to provide an improved fluid pressure responsive device of the diaphragm type that will have a low order of deflection for a given force and will produce a high order of linear output for a given change in applied fluid pressure force on the diaphragm while still having a high degree of sensitivity and accuracy.

A further object is to provide an improved force sensing element that can have a predetermined non-linearity in its electrical output for a given deflection whereby it may be used in any type of application in which it is desirable to either balance out non-linearity of a member which actuates the sensing element or, if desired, to augment such non-linearity.

A still further object is to provide an improved force sensing element that will have a predetermined non-linearity of electrical output vs. applied force and will be relatively simple and economical in construction and manufacture while still retaining desired precision qualities.

Figure 1:
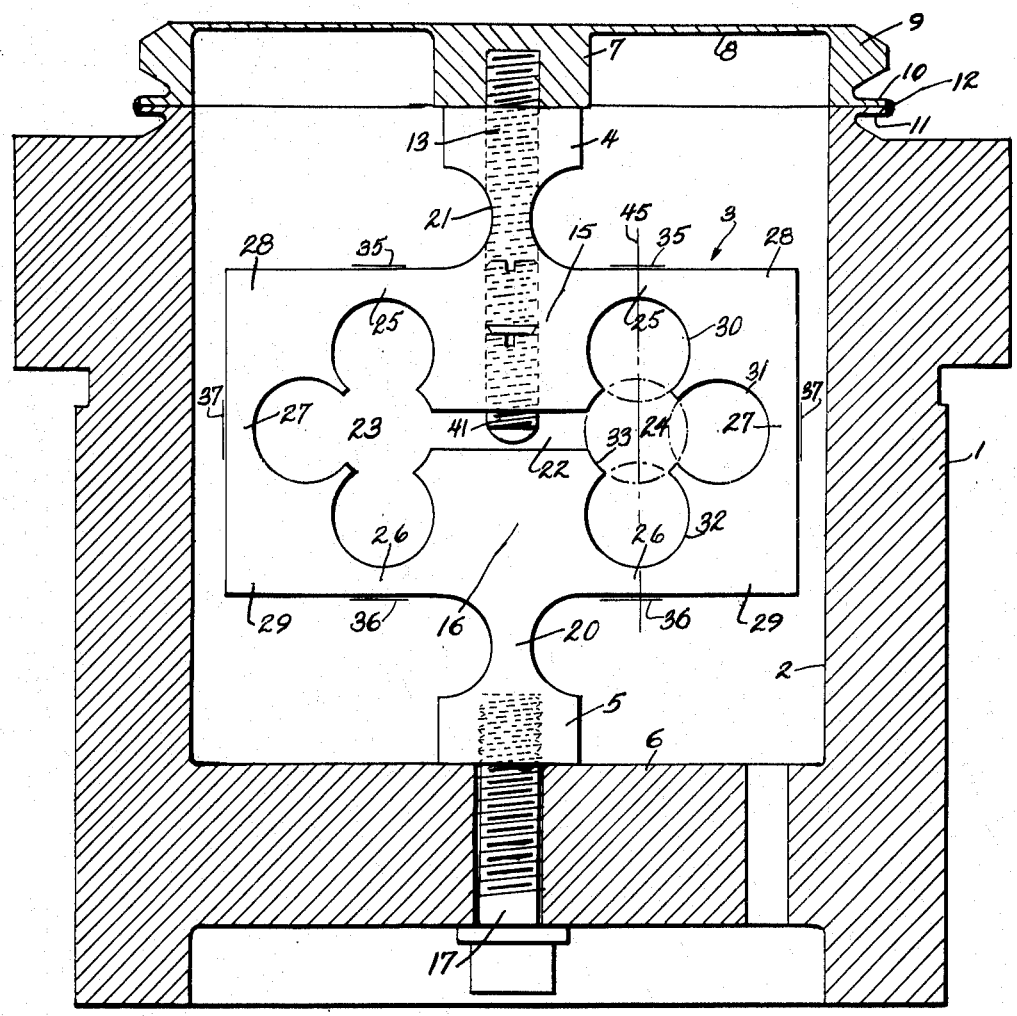
Figure 2:
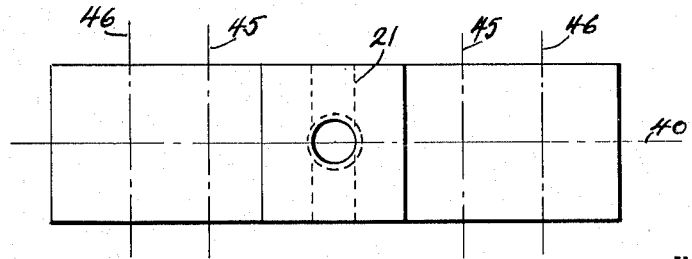

Other objects and advantages will be more apparent to those skilled in the art from the following description of the accompanying drawings in which:

FIG. 1 is a cross-sectional view of my improved device but with the force-sensing element shown in side elevation, and FIG. 2 is a plan view of the force sensing element per se.

In the particular embodiment of the invention disclosed herein, a casing 1 preferably circular in plan view has a recess 2 in which is disposed by improved force sensing element generally indicated at 3. This element is preferably rectangular in shape both in side elevation and in plan, FIG. 2. It has upper and lower centrally located load transmitting ends 4 and 5 which are preferably rectangular in plan view, for engagement with the bottom 6 of the casing and with a suitable boss 7 extending inwardly from a relatively thin flat diaphragm 8. This diaphragm has a relatively heavy annular rim 9 terminating in a narrow annular portion 10 to match a corresponding narrow annular portion 11 of the casing 1 whereby portions 10 and 11 may be secured together by a circular bead of welding 12. The load transmitting end 4 is suitably secured to boss 7 by a threaded stud 13 extending into a threaded opening of the elements 4 and 7 while the lower end 5 is secured to the base by a stud 17 threaded into end 5. The diaphragm has the non-linearity previously mentioned.

To have the sensing element 3 produce non-linearity opposite to that of the diaphragm, the interior configuration of the sensing element is such as to provide on each lateral portion of element 3 relatively narrow flexible sections 25, 26 and 27 and heavy relatively inflexible intermediate sections 28 and 29 as well as heavy inflexible portions 15 and 16 which separate the two flexible portions 25 and two flexible portions 26. To insure concentration of load within the relatively heavy sections 15 and 16 the load transmitting portions 4 and 5 include curved necked down portions 20 and 21. For ease of manufacture of the flexible and inflexible portions I provide transverse openings 23 and 24 of substantially clover leaf outline formed preferably by drilling four over-lapping holes 30, 31, 32 and 33 with the hole 33 intersecting a transverse slot 22 which separates the portions 15 and 16. Holes 30, 32 and 33 preferably have their centers in a common plane 45 and the center of holes 31 are on lines 46.

Strain gages 35, 36 and 37 preferably of the bonded electrical resistance filament type are disposed preferably on the outside surfaces of the sensing element adjacent each of the narrow flexible sections and are located on the crosswise axis 40 passing through each of the narrow sections 27, 27. The gages are connected into a Wheatstone bridge or other measuring circuit well known in the art.

As a result of my improved construction, I am able to produce a non-linearity of output of the gages vs. deflection of the element 3 that will be opposite in sign to the non-linearity of the deflection of diaphragm vs. fluid pressure force applied thereto, thereby effecting a compensating action. The degree of this compensation may be controlled in accordance with the thickness of the narrow sections 25, 26 and 27.

My improved arrangement is particularly effective for low capacity fluid pressure devices such as from 50 to 350 pounds pressure, per square inch. The device also lends itself to having a very effective safety limit stop by the provision of a screw 41 threaded in the portion 15 prior to assembly of the diaphragm 8 with the casing 1 and spaced a desired distance from the lower portion 16 to allow whatever deflection of the element is necessary for its maximum output.

The non-linearity of the element 3 can be seen from the fact that as the central portions 15 and 16 move towards each other the vertical sides on which the gages 37 are mounted will bow outwardly thereby increasing the moment arm acting on these sides so as to make them even more sensitive to further bending with increasing application of force. At the same time the upper and lower horizontal sides bow inwardly toward each other but their moment arm remains relatively constant. The gages 37 thus have an output which increases somewhat more than linearly and it is this non-linearity that tends to compensate for the non-linearity of the diaphragm which is in the opposite direction.

From the foregoing disclosure it is seen that I have provided a relatively simple force measuring device that is especially adapted for very low capacities and that when used in combination with a fluid pressure-actuated diaphragm of non-linear characteristics can effect a compensating action against such diaphragm to make the overall output of the device have an appreciable degree of linearity. These precision results are accomplished with a force-sensing unit that is relatively simple and economical to manufacture as well as being extremely rugged and capable of small and compact size for lower capacity units. The unit has been made for capacities as low as 50 pounds per square inch with an extreme compactness of .900″ between gages 37, and ½″ between gages 35 and 36. The drawings are thus greatly magnified for low capacity units.

It will, of course, be understood that various changes in details of construction and arrangement of parts may be made by those skilled in the art without departing from the spirit of the invention, as set forth in the appended claims.

I claim:

1. A force measuring device comprising, a force responsive element in the form of a substantially inflexible substantially rectangular parallelepiped having substantially vertically extending sides and upper and lower substantially horizontally extending sides between which a vertical force may be applied along a given axis, said element having an opening formed therein with an axis extending transversely to said applied force axis, and said opening having a configuration and proportions in relation to the external configuration and proportions of said element producing relatively flexible wall portions in the horizontal sides of said element offset laterally from the applied force axis on each side thereof and relatively flexible wall portions in the vertical sides of said element, whereby when the element is subjected to an applied compression force the flexible horizontal wall portions and the flexible vertical wall portions are respectively subjected to strains of opposite signs, and strain responsive gages connected to said element adjacent said flexible wall portions so as to be responsive to said opposite strains.

2. The combination set forth in claim 1 further characterized in that each horizontal side has a relatively inflexible portion between the laterally spaced flexible portions of such sides and aligned with said axis to receive forces applied along said axis.

3. The combination set forth in claim 1 further characterized in that each horizontal side has relatively inflexible portions disposed between the flexible portions of the horizontal sides, and the transversely-extending opening in said element has a plurality of substantially semicircular holes formed with radii whose centers are spaced from horizontal sides a predetermined distance to create the flexible horizontal wall portions and further substantially semi-circular holes formed with radii whose centers are spaced inwardly from the vertical sides of the element a predetermined distance to determine the thickness of the flexible vertical wall portions.

4. The combination set forth in claim 1 further characterized by the provision of means transmitting load to the horizontal sides along the applied force axis, said load transmitting means comprising portions of said element extending from said sides in opposite directions along said force axis and which are substantially rectangular in cross section transverse to said axis.

5. A fluid pressure measuring device comprising a base, a force responsive element having oppositely-disposed ends for transmitting force along a given axis, one of said ends being supported on said base, diaphragm means connected to the other of said ends, means connecting the diaphragm means to said base, the deflection of said diaphragm means in response to force being a non-linear relation, said force responsive element comprising two substantially inflexible spaced central portions fixed with different ones of said ends and movable toward and away from one another along said axis, lateral portions each in the form of a substantially inflexible substantially rectangular parallelepiped integral with both of said central portions and each extending laterally of said axis and central portions and joining said central portions, each of said lateral portions having an opening therethrough extending transversely to the direction of said axis and merging with the space between said central portions and forming a wall portion displaced from said axis which extends substantially in the direction of said axis and which is of relatively small cross section permitting bowing thereof outwardly away from said axis, said lateral portions further having sides formed by the openings extending in direction substantially transversely to said axis each including a flexible wall portion of relatively small cross section which is nearer to said axis than the displaced bowing wall portion thereof and which permits bending of the transverse sides in direction of said axis, whereby compression and tension strains which are non-linear in response to a given deflection of the diaphragm are developed at the wall portions of each of said lateral portions and are opposite to the non-linearity of the diaphragm means, and strain responsive gages connected to tension and compression areas of the wall portions of said lateral portions.

6. A force measuring device comprising a force responsive element having oppositely-disposed ends for transmitting force along a given axis, two substantially inflexible spaced central portions fixed with different ones of said ends and movable toward and away from one another along said axis, lateral portions each in the form of a substantially inflexible substantially rectangular parallelepiped integral with both of said central portions and each extending laterally of said axis and central portions and joining said central portions, each of said lateral portions having an opening therethrough extending transversely to the direction of said axis and merging with the space between said central portions and forming a wall portion displaced from said axis which extends substantially in the direction of said axis and which is of relatively small cross section permitting bowing thereof outwardly away from said axis, said lateral portions further having sides formed by the openings extending in direction substantially transversely to said axis each including a flexible wall portion of relatively small cross section which is nearer to said axis than the displaced bowing wall portion thereof and which permits bending of the transverse sides in direction of said axis, whereby compression and tension strains are developed at the wall portions of each of said lateral portions, strain responsive gages connected to tension and compression areas of the wall portions of said lateral portions, and casing means enclosing said element and including a base connected with one of said ends and axially-yieldable means connected with the other of said ends.

7. A force measuring device comprising a force responsive element shaped from a solid in the general form of a substantially inflexible substantially rectangular parallelepiped and having oppositely-disposed sides between which a force may be applied along a given axis substantially normally thereto, said element having an opening formed therethrough in direction substantially transverse to the direction of said axis and substantially symmetrically in relation to said axis, said opening extending laterally of each side of said axis to within a predetermined relatively small distance from each lateral side wall of said element to reduce the cross section at each of said lateral side walls to an amount which permits bowing of said side walls in directions away from said axis in response to compression force applied to said opposite sides along said axis, and said opening further extending longitudinally in direction of said axis laterally on each side of said axis to within a predetermined relatively small distance from each of said oppositely-disposed sides of said element to reduce the cross section at each of said oppositely-disposed sides and at a predetermined lateral distance nearer to said axis than said lateral side walls to an amount which permits bowing of said opposite sides toward one another in response to compression force applied to said oppositely-disposed sides along said axis, said element having relatively inflexible portions of relatively large cross sections connecting the sites of the reduced cross sections to surround said opening, whereby compression and tension strains are developed at the sites of the reduced cross sections, strain responsive gages connected to tension and compression areas of the sites of the reduced cross sections, and casing means enclosing said element and including a base connected to one of said oppositely-disposed sides and axially-yieldable means connected with the other of said oppositely-disposed sides.

References Cited by the Examiner
UNITED STATES PATENTS

| | | | |
|---|---|---|---|
| 2,561,318 | 7/1951 | Ruge | 73—88.5 X |
| 2,737,051 | 3/1956 | Sanderson | 73—398 |
| 2,981,912 | 4/1961 | Di Giovanni | 73—398 X |

RICHARD G. QUEISSER, *Primary Examiner.*
JOSEPH P. STRIZAK, *Examiner.*